United States Patent

Sedley

Patent Number: 5,854,844
Date of Patent: Dec. 29, 1998

[54] COMMENTARY SYSTEMS

[76] Inventor: Bruce Samuel Sedley, 30 Broadway, 5th floor, Flat C, Mei Foo Sun Chuen, Kowloon, Hong Kong

[21] Appl. No.: 711,819

[22] Filed: Sep. 10, 1996

[30] Foreign Application Priority Data

Sep. 12, 1995 [GB] United Kingdom ............ 9518601

[51] Int. Cl.⁶ ........................................... H04B 5/00
[52] U.S. Cl. ...................................... 381/79; 455/41
[58] Field of Search ............................ 381/79, 25, 77, 381/82; 455/41

[56] References Cited

U.S. PATENT DOCUMENTS

| | | | |
|---|---|---|---|
| 4,824,375 | 4/1989 | Weiner | 381/79 |
| 4,908,869 | 3/1990 | Lederman | 381/79 |
| 5,128,991 | 7/1992 | Murata | 379/361 |
| 5,201,003 | 4/1993 | Pavel | 381/25 |

*Primary Examiner*—Vivian Chang
*Attorney, Agent, or Firm*—Miller, Sisson, Chapman & Nash, P.C.

[57] ABSTRACT

A commentary system for exhibits at museums includes a recorded commentary store and an output amplifier which supplies the recorded message to an aerial. Visitors to the museum are provided with a pick-up coil and an earphone connected directly to the coil. The coil is placed firmly closely adjacent the aerial to inductively couple the aerial and coil so that the visitor may hear the commentary. The pick-up coil and the earphone require virtually no maintenance and no power supply. The audio signal is generated solely by energy derived from the broadcast.

6 Claims, 3 Drawing Sheets

COMMENTARY SYSTEMS

BACKGROUND OF THE INVENTION

1. Field of the Invention

The invention relates to commentary systems.

2. Description of Prior Art

The invention relates more particularly to commentary systems for use at exhibitions, museums, zoos, aquariums and the like to provide information about exhibits or areas of their surroundings to visitors.

Many such systems are in use today and include tape playback machines that are rented to visitors to carry through the facility, individual electronic hand-held earphones that receive broadcast signals from radio transmissions, and self-contained hand-held earphones with solid state memories. In some cases, messages may be selected by the visitor by means of a keypad provided on the hand-held earphones.

These systems have certain disadvantages. They are relatively expensive to manufacture and therefore represent a significant investment for the facility (museums, zoo, etc). As a result, the effective or actual cost to each visitor is high and so only a small percentage of visitors usually avail themselves of the commentary service. Some facilities that use these expensive devices require a cash deposit or other security. These systems also require full time clerks to vend and retrieve the units and to check the remaining battery time, or put the units in a recharger for the next use.

SUMMARY OF THE INVENTION

It is an object of the invention to overcome or at least reduce these problems.

According to the invention there is provided a commentary system for individual exposition of exhibits and the like to visitors at an exhibition, the system comprising a recorded commentary arranged to be broadcast by an aerial disposed adjacent the exhibit, a pick-up head for receiving the broadcast when placed closely adjacent the aerial so as to be inductively coupled thereto, and a loudspeaker directly coupled electrically to the coil for converting the broadcast into audio signals.

The aerial may comprise a number of wire loops arranged to be connected to an output amplifier providing the recorded broadcast.

The aerial may comprise a length of multi-conductor ribbon connector wire in which the ends are selectively connected to form a plurality of electrical loops.

A strip low permeability material is preferably mounted under and along the path of the aerial.

The aerial may be mounted adjacent and along a part of the exhibit or an area for viewing the exhibit.

The system may include an elongate mount for supporting the pick-up coil at its end to enable the coil to be conveniently and manually held closely adjacent the aerial.

The mount preferably comprises a reelable metallic tape arranged to be reeled in and out of a hand-holdable container as required.

The pick-up head may be at least partly electrically connected to the loudspeaker by passing current through the metallic tape.

The loudspeaker may comprise one or more earphones.

The or each earphone may be connected to the pick-up coil by wires which are arranged to be reeled up simultaneously with the metallic tape.

The or each earphone may be connected to the pick-up coil via a jack and socket.

BRIEF DESCRIPTION OF THE DRAWINGS

A commentary system for individual recorded exposition of exhibits at a museum will now be described by way of example with reference to the accompanying schematic drawings in which.

DESCRIPTION OF THE PREFERRED EMBODIMENTS

Figure 1:
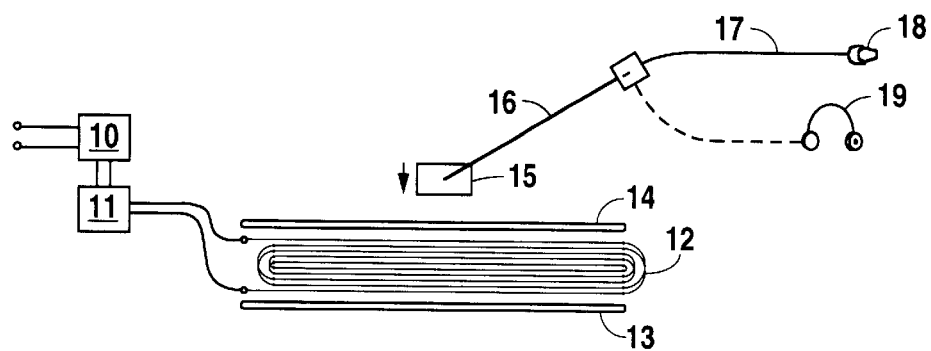
FIG. 1 is an exploded view of the system.

Referring to the drawings, in FIG. 1 a record broadcasting unit supplied from a mains supply includes a record store 10 and an output amplifier 11. The amplifier is connected by a twin core cable to an aerial 12 mounted closely against a low permeability steel strip 13 and covered by a protective adhesive tape 14. Such parts are permanently fixed in place and the aerial mounted adjacent an exhibit. The record stored in the broadcaster unit is pre-prepared and relative to the exhibit, and provides a short exposition of the exhibit for a visitor. The visitor is therefore provided with a pick-up coil 15 mounted on one end of a hand holdable stick 16, and at the other end of the stick, a twin core cable 17 connects a single earphone 18 (or a headset if preferred).

In use, the visitor must press the pick-up coil closely and firmly against the tape 14 (in the direction of the arrow) so that the coil 14 can inductively couple to the aerial so that the broadcast is relayed to and converted into sound signals at the earphone 18.

Figure 2:
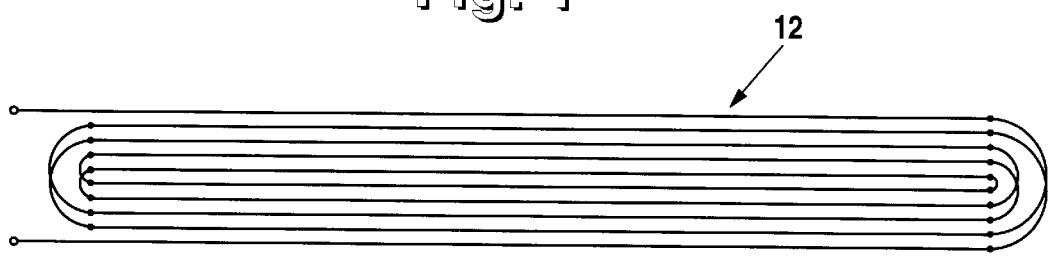
FIG. 2 is a plan view of an aerial for the system.

In FIG. 2, the plan view of the aerial can be seen more clearly and shows the aerial comprising a length of standard ten core flexible ribbon cable connector (such cable connectors commonly used for coupling components of computer systems). Individual wires of the cable connector have been joined at their ends so as to form electrical loops along the length. It will be appreciated that other methods or arrangements of connections can also be used to form suitable loops or aerials for the system.

Figure 3:
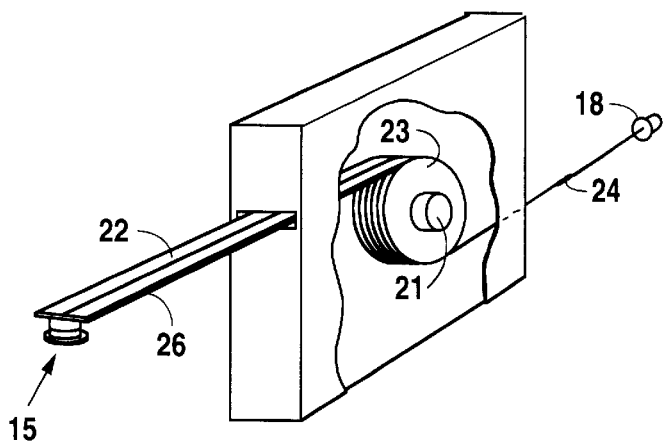
FIG. 3 is a visitor's pack forming part of the system.

In FIG. 3, the visitor's pack consists of a housing 20, shown partly cut away, in which is mounted a spindle 21 supporting a central reel on which a steel tape or strip 22 is wound. A second part or separate reel 23 is provided for wrapping up a twin core cable 24 connected to the earphone 18. The pick-up coil 15 is mounted on the end of the steel strip 22 and is connected electrically by an electrical path along strip itself and by a single core insulated wire 26 mounted to the strip.

Normally, the strip or tape 22 and the cable 24 are fully wound up and contained within the housing 20. Indeed, the reels may be spring-biassed, in the same manner as often applied to a reeled measuring tape, so as to return normally to a wound up position. In any event, when a visitor wishes to use the broadcast system, he unwinds or pulls out the steel tape 22 and places the earphone 18 on his ear. He then presses the pick-up coil 15 against the aerial, the steel tape 22 being sufficiently stiff, even when the visitor holds the housing 20, to support the pick-up head 15 firmly against the aerial. When the pack is no longer required, permanently or temporarily, the tape 22 and cable 24 can be conveniently wrapped up inside the housing for transport and/or storage. Generally the housing, the coil 15 and earphone 18 can fit conveniently into a coat pocket, for example.

Figure 4:
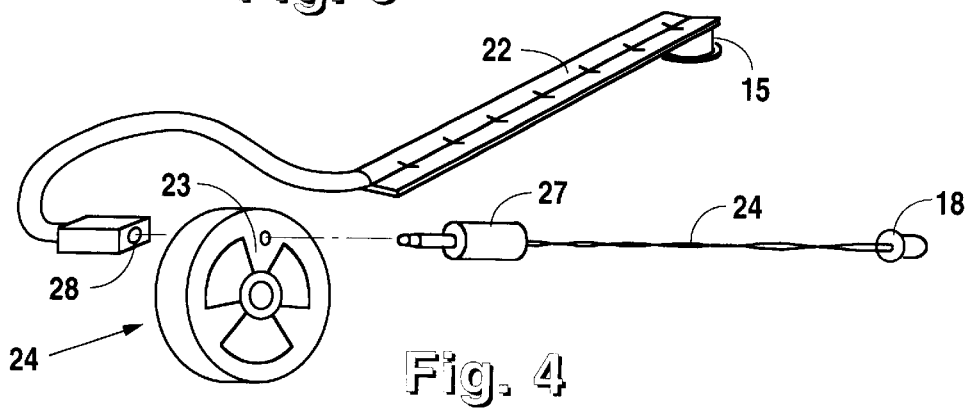
FIG. 4 shows an exploded partial view of an alternative visitor's pack.

In FIG. 4, the visitors pack is overall generally the same the pack shown in FIG. 3, except that a winding handle for the steel tape reel is provided by a jack plug 27. A socket 28 for the jack plug is electrically connected to the pick-up coil via the steel tape 22 and is mounted to a spoke 23 of a tape reel 24. When it is necessary to turn the wheel to reel up, or perhaps unreel, the tape 22, the jack plug can be inserted and used as a miniature handle. Normally, the jack plug 27 is held tight by the user, so as not to rotate, and thereby avoid twisting the cable 24 connecting to the earphone 18 during use as a handle.

Figure 5A:
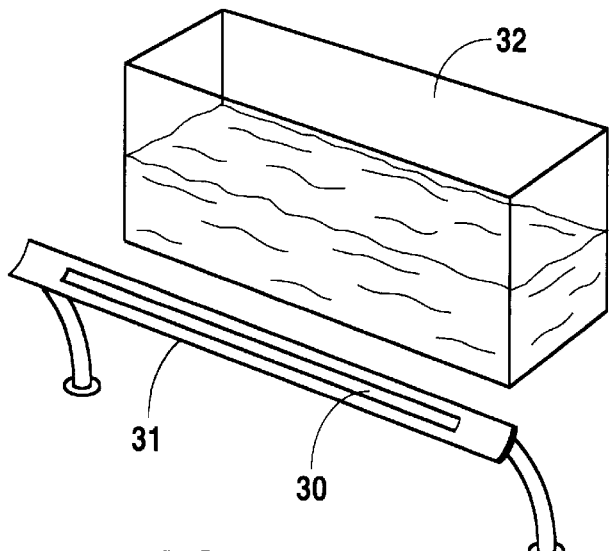
FIGS. 5A, 5B and 5C show various arrangements for relatively positioning the aerial.
Figure 5B:
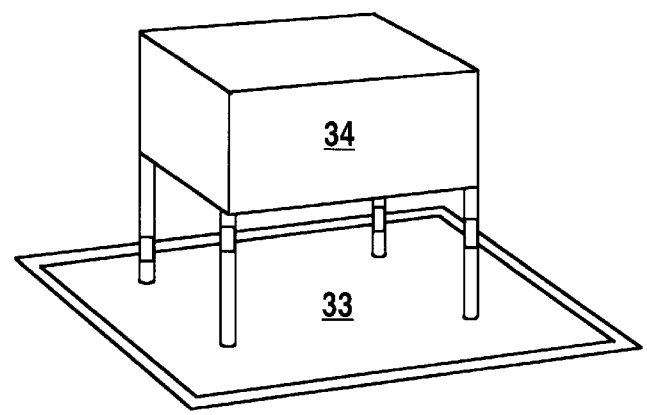
Figure 5C:
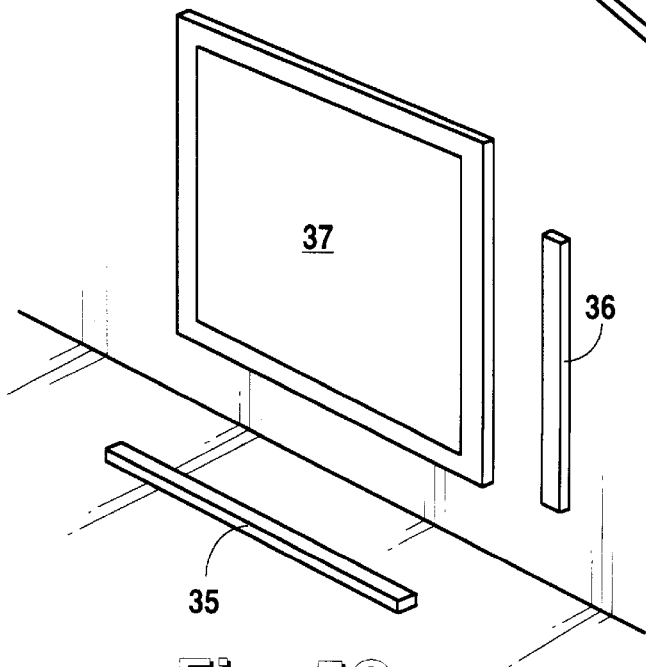

In FIG. 5A, an aerial 30 is shown attached to a guard rail 31 which is mounted in front of an exhibit 32. FIG. 5B shows a floor mounted aerial 33 extending around a stand-supported exhibit 34. FIG. 5C shows a floor mounted aerial 35 and a wall mounted aerial 36 adjacent a wall mounted exhibit 37, for example a painting.

It will be appreciated that in embodiments of the invention, the pick-up coil and earphone, and even the reeled steel tape can be made up for a very low cost as the construction is relatively simple and comparatively poor quality sound reproduction is normally quite acceptable for the visitors. Thus, what the visitor is provided with requires a quite low investment by the facility providing the commentary service and therefore in use only a small deposit or charge will be required in practice. It will be also noted that the visitors part of the system requires virtually no maintenance and certainly, and importantly, no power supply. Thus, the replacement, re-charging, and checking the condition of any batteries is completely eliminated.

It is a relatively simple matter also to provide the exposition or commentary in several languages, the aerials may simply be identified by label or colour, say, so that a visitor can place his pick-up coil against the particular aerial to select a language of his choice.

The aerials can be placed at any convenient place next to an exhibit, on the floor nearby, along a cabinet surface in which an exhibit is displayed, on an adjacent wall surface and so on. In an open museum or zoo, the aerial can be placed at a viewing platform or area, or at a side of a footpath where appropriate. Even so and especially when compared to normal radio or other transmissions, there is no interference or cross-talk between different languages or different exhibit broadcasts when using embodiments of this invention. In any event or preferably, the aerial is normally a convenient length to allow, say, 6 or more people to use it simultaneously and the recorded message is arranged to last, say, one to two minutes. The expositions or messages may run continuously or be triggered by a switch or key-card as preferred.

Figure 6A:
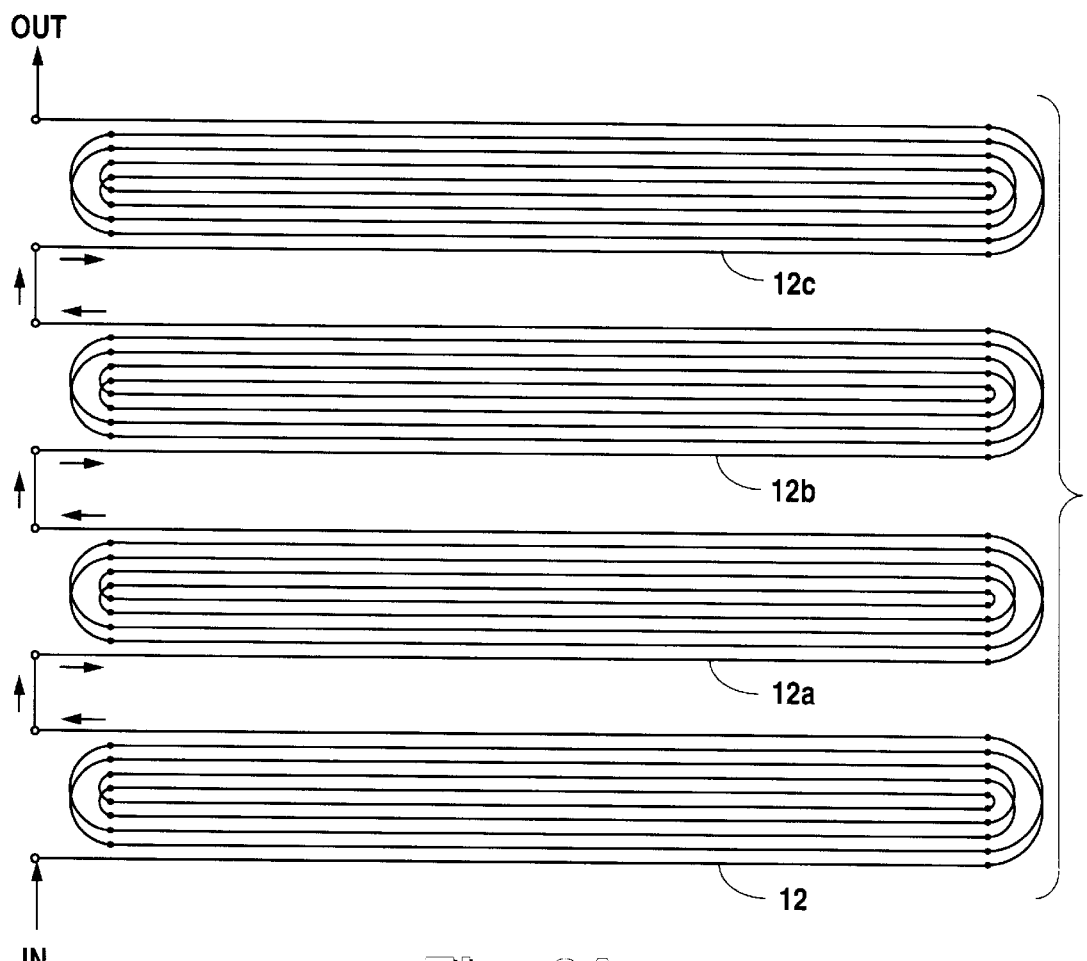
FIG. 6A is an exploded view of a multi-layer aerial for the system.
Figure 6B:
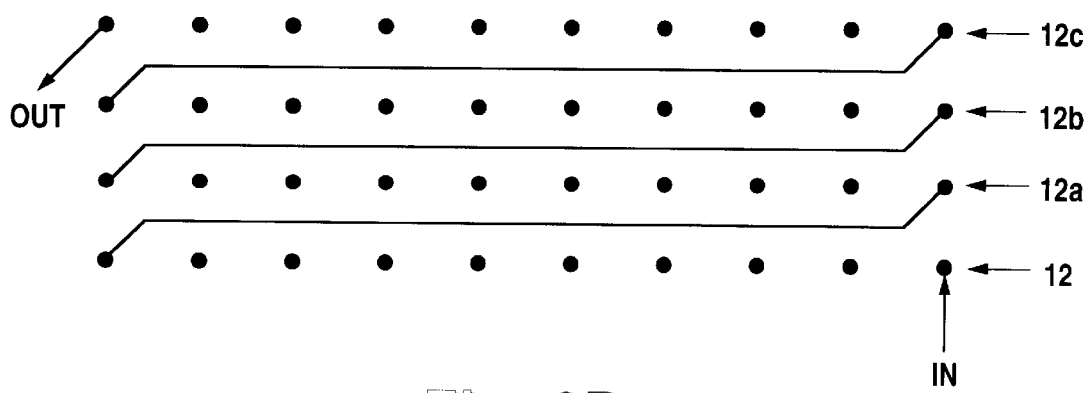
FIG. 6B is an isometric view showing the multi-layers one above the other.

Although a single layer aerial such as shown in FIG. 2 may provide sufficient volume for the loudspeakers, the volume can be increased by adding extra layers 12a, 12b, and 12c of the single aerial on top of a base layer 12 shown in FIGS. 6A and 6B. However the orientation of each succeeding layer must be reversed from the one below. Thus the flux in each layer reinforces the flux in adjacent layers and each successive layer serves to increase the volume of the sound. If such a series of layers is made, the composite aerial could be high off the floor and visitors could trip over it. A suitable carrier with ramps can be provided up to the top layer on each side, similar to the protective ramped carriers used on either side of electrical cables that cross walkways temporarily.

I claim:

1. A commentary system for individual exposition of exhibits to visitors at an exhibition comprising a commentary arranged to be broadcast by an aerial which has a highly localized electric signal field disposed adjacent said exhibit, a pick-up coil closely adjacent said aerial inductively coupled thereto, and a loudspeaker directly connected to said coil for converting said broadcast into audio signals, said audio signals generated solely by energy derived from said broadcast without the need for any additional amplification.

2. A system according to claim 1, in which said aerial comprises a single electrical loop arranged to be connected to an output amplifier providing said broadcast.

3. A system according to claims 2, in which said aerial comprises a length of multi-conductor ribbon connector wire in which ends are selectively connected to form said single electrical loop.

4. A system according to claim 2 further comprising a mount for said pick-up coil, said mount having a reelable metallic tape arranged to be reeled in and out of a hand-holdable container.

5. A system according to claim 2, in which said aerial comprises a plurality of connected together single electrical loops arranged in respective layers, wherein orientation of adjacent layered loops are electrically reversed.

6. A system according to claim 3 further comprising a strip of low permeability material mounted adjacent and along a path of said aerial.

* * * * *